United States Patent [19]
Zürner

[11] 3,738,231
[45] June 12, 1973

[54] PISTON FOR INTERNAL COMBUSTION ENGINES

[75] Inventor: Hans-Jürgen Zürner, Nurnberg, Germany

[73] Assignee: Maschinenfabrik Augsburg-Nurnberg Aktiengesellschaft, Nurnberg, Germany

[22] Filed: May 28, 1971

[21] Appl. No.: 148,082

[30] Foreign Application Priority Data

May 29, 1970   Germany .............. P 20 26 272.0

[52] U.S. Cl. ................................ 92/159, 92/222
[51] Int. Cl. ........................... F16j 1/08, F16j 9/22
[58] Field of Search ................ 92/158, 159, 222; 277/189.5

[56] References Cited
UNITED STATES PATENTS

| 1,218,986 | 3/1917 | Dodge | 92/159 |
| 1,464,612 | 8/1923 | Madler | 92/158 |
| 1,504,448 | 8/1924 | Hanch | 92/158 |
| 1,535,571 | 4/1925 | Burdick | 92/222 |

FOREIGN PATENTS OR APPLICATIONS

| 1,178,744 | 12/1958 | France | 277/189.5 |
| 581,527 | 10/1946 | Great Britain | 277/189.5 |

Primary Examiner—Irwin C. Cohen
Attorney—Walter Becker

[57] ABSTRACT

A piston for internal combustion engines, in which the peripheral surface of the piston is provided with a plurality of groove means having piston rings mounted therein, in which between that one of the groove means which is nearest to the piston bottom and the groove means nearest to the last mentioned one of said groove means there is provided recess means for receiving and storing lubricating oil.

1 Claim, 2 Drawing Figures

PISTON FOR INTERNAL COMBUSTION ENGINES

The present invention relates to a piston for internal combustion engines, especially for high output internal combustion engines, with a piston ring support for at least the piston ring adjacent to the piston bottom. With presently customary high output engines, the piston has to meet higher and higher requirements of mechanical and thermal nature. One of the most stressed piston areas is the annular groove located adjacent to the combustion chamber. The piston ring provided in said last mentioned annular groove has practically to absorb the full combustion pressure which, of course, has its effect on said groove. The friction of the piston ring at the flanks of said grooves may be further increased by thermal and mechanical deformation of the piston whereby a wearing out of the annular groove and thus a tilting of the piston ring will be aided.

In an endeavor to eliminate the above mentioned drawback, it has been suggested with high output pistons to provide a wear-resistant piston ring carrier at least for that piston ring which is adjacent to the piston bottom. In such an instance the piston ring carrier is cast into the piston body and is anchored therein in a suitable manner.

The upper piston ring and the top land are directly exposed to the temperatures occurring in the cylinder. This fact results in the accumulation of residues from combustion. These residues deposit on the top land which means on that piston mantle portion which is located between the piston bottom and that piston ring which is located adjacent to the piston bottom, and primarily in the groove containing said last mentioned piston ring.

Consequently, glazed areas form in the cylinder sleeve and increased wear and finally a jamming of the piston ring are the results. Inasmuch as the outer surface of the piston ring carrier is for machining reasons and due to different heat expansion which could likewise cause seizing, set back somewhat relative to the piston mantle, oil carbon deposits to a particularly great extent collect at the thus formed steps.

In order to prevent a jamming of the particularly endangered piston ring which is adjacent to the piston bottom, double trapezoidal rings are employed which, however, are expensive. Furthermore, it becomes necessary to design the top land relatively great in order to relieve the ring portion.

All of these suggestions are, however, more or less semi-solutions because the reason proper for the drawbacks to be eliminated, namely, the deposit of carbon residues remains as before, and in view of the greater top land there is even formed a greater deposit area.

It is, therefore, an object of the present invention to provide a high output piston for internal combustion engines which will definitely overcome the above mentioned drawbacks.

It is another object of this invention to provide a high output piston for internal combustion engines as set forth in the preceding paragraph, which will be simple and inexpensive to manufacture and in which the deposit of oil carbon on the top land and below that piston ring which is adjacent to the piston bottom and especially in the groove for said piston ring will be avoided.

These and other objects and advantages of the invention will appear more clearly from the following specification, in connection with the accompanying drawings, in which.

Figure 1:
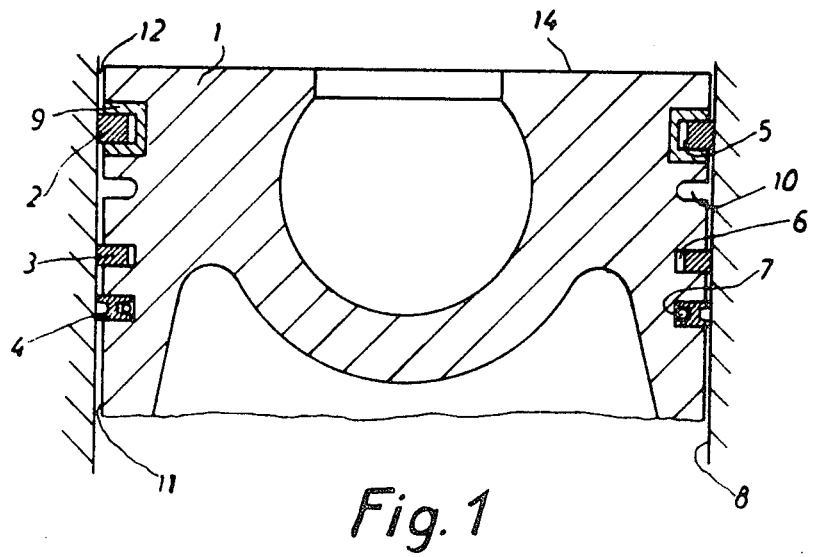
FIG. 1 shows the upper portion of a cast metal reinforced piston with the features of the present invention.

The piston according to the present invention is characterized primarily in that below that annular groove which receives the piston ring adjacent to the piston bottom there is provided recess means serving as oil catching groove and open only toward the cylinder bore.

The oil catching groove is expediently arranged not in the ring carrier for that piston ring which is adjacent to the piston bottom, but is arranged below said piston ring directly in the mantle of the piston. It is in the said oil catching groove that during the piston movements the oil on the cylinder bore surface collects whereby the said piston ring and the groove therefor, as well as the top land are continuously supplied with oil. In view of the dispersing effect of the lubricant, a build up of carbon at these areas is prevented to a major extent. There is furthermore obtained the advantage that instead of an expensive double trapezoidal ring, a customary rectangular piston ring may be employed.

A further improvement is obtained according to the invention by having the outer surface of the ring carrier not set back relative to the polished section or sliding surface of the piston, but the cast-in ring carrier is located directly in said sliding area. As a result thereof, the gas blow is reduced and the build up of carbon directly over the ring closest to the piston bottom will be avoided.

According to a still further feature of the invention, it is suggested to design the ring carrier of a material with approximately the same heat expansion as the piston body or to design said ring carrier as a shrunk-on ring which latter is pushed onto the piston from the piston bottom side with only a slight overlap of from one-tenth to two-tenths. The advantage of this design consists in that a still smaller top land is obtained with only a slight tendency to collect carbon residues, and the advantage is furthermore seen in the fact that also forged pistons can be employed.

With regard to the present invention it may, for the sake of completeness, also be mentioned that an internal combustion engine piston has become known which at the piston bottom edge portion is provided with an angular protective ring and the piston groove of which is provided with an inclined edge by which an oil passage is formed. In the protective ring itself there is provided an oil groove which communicates through bores with said oil passage which latter on one hand is supplied with oil through bores from the interior of the piston. An oil circulation is supposed to take place through these passages, which oil circulation should sufficiently cool the protective ring.

Aside from the fact that in this instance a completely different piston is involved and that above all the cooling of the protective ring is involved which is not to be compared with a presently customary piston ring, such device is not applicable for a piston for use in connection with the present invention. This is due to the fact that an inclined edge would aid in the wearing out of the piston ring. Moreover, such oil passage coinciding directly with the annular groove of the protective ring, conveys all impurities collected thereon into the annular groove so that the protective ring eventually gets stuck. Finally, the annular groove is additionally impurified from the piston bottom by means of combustion residues. Such a device would not be suitable for high output pistons.

Referring now to the drawing in detail, the arrangement shown therein comprises a piston body 1 with piston rings 2, 3 and an oil wiper ring 4 respectively in the annular grooves 5, 6 and 7, while the cylinder bore is designated with the reference numeral 8 and has the piston body 1 reciprocably mounted therein. The upper piston ring 2 is arranged in a customary ring carrier 9. Between the annular grooves 5 and 6 there is provided in the piston body 1 a recess 10 between the annular grooves 5 and 6.

In view of the piston movements, the oil on the cylinder bore surface 8 is dammed up in the oil catching groove 10 so that the piston ring 2 and that portion of the piston mantle 8 which is located thereabove and which is designated as top land 12 is always actuated upon by oil. A collection of carbon residues is no longer possible. The outer surface of the ring carrier 9 is located in the sliding surface of the piston mantle.

Figure 2:
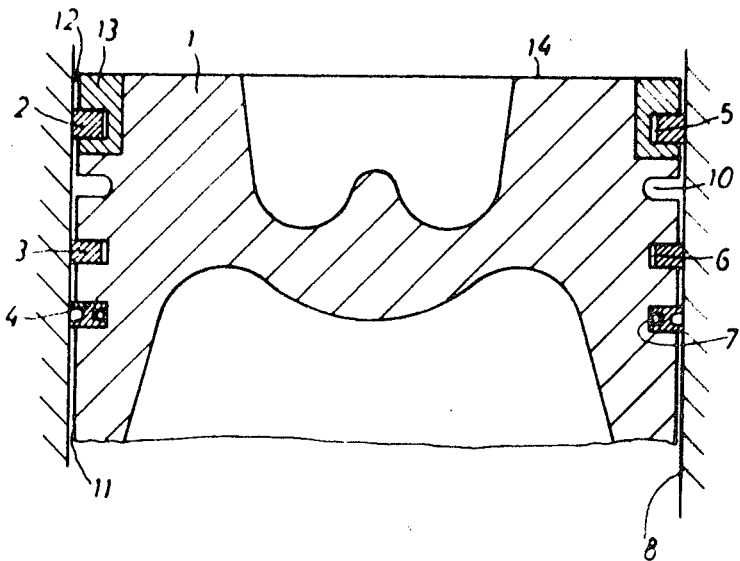
FIG. 2 shows the upper portion of a piston according to a further development of the invention.

FIG. 2 shows the same part as FIG. 1 with the same reference numerals applied thereto. As already mentioned, the top land 12 may be kept small. In order to achieve this, the ring carrier receiving the piston ring 2 is designed as shrunken ring 13 and with an only slight overlap the same is slipped from the piston bottom 14 onto the piston body 1. With this arrangement it is important that the outer surface of the shrunken ring 13 is located within the sliding surface of the piston mantle 11 whereby steps are avoided on which carbon oil may deposit or collect.

It is, of course, to be understood that the present invention is, by no means, limited to the particular showing in the drawing, but also comprises any modifications within the scope of the appended claims.

What I claim is:

1. A piston with a piston bottom for internal combustion engines, especially high output internal combustion engines, in which the peripheral surface of the piston is provided with a plurality of annular groove means, and which comprises piston ring means respectively arranged in said annular groove means, the peripheral surface of said piston also being provided with recess means for receiving and storing lubricating oil, said recess means being open only toward the outside of said piston and being completely separated from neighboring groove means and located between that one of said groove means which is nearest to said piston bottom and the groove means nearest to said last mentioned one of said groove means, that annular groove means which is nearest said piston bottom being formed by an annular piston ring carrier inserted into and firmly seated in said piston, said ring carrier including a single ring groove therein and having its outer peripheral surface substantially flush with the adjacent peripheral surface of said piston being formed by a shrunk ring shrunk onto said piston and of a material having a coefficient of heat expansion corresponding substantially to that of said piston, said shrunk ring being shrunk upon said piston with slight overlap, said recess means including parallel walls being at right angles to the peripheral surface of the piston with the depth of the recess means corresponding to the depth of remaining groove means and being worked directly into the peripheral surface of the piston, said recess means being located between said ring carrier and the groove means next to said ring carrier, and a top land between said piston bottom and the groove means adjacent thereto, said top land being as short as possible.

* * * * *